US006947528B1

(12) United States Patent
Ko et al.

(10) Patent No.: US 6,947,528 B1
(45) Date of Patent: Sep. 20, 2005

(54) ARRANGEMENT FOR LOCAL RECORDING OF A VOICE MESSAGE FOR DELIVERY TO DESTINATION MESSAGING SYSTEM VIA AN IP NETWORK

(75) Inventors: Ya-Tien Ko, Manalapan, NJ (US); Kevin Lee Chestnut, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 10/057,889

(22) Filed: Jan. 29, 2002

(51) Int. Cl.[7] ............................................. H04M 1/64
(52) U.S. Cl. .................................... 379/88.17; 379/68
(58) Field of Search ......................... 379/88.13, 88.18, 379/88.17, 88.25, 67.1, 88.22, 201, 93.01, 379/218.01, 68

(56) References Cited

U.S. PATENT DOCUMENTS

| | | | | |
|---|---|---|---|---|
| 4,757,525 | A | * | 7/1988 | Matthews et al. ........ 379/88.26 |
| 5,568,538 | A | * | 10/1996 | Tamir et al. ............. 455/412.1 |
| 6,014,711 | A | * | 1/2000 | Brown ........................ 709/245 |
| 6,061,432 | A | | 5/2000 | Wallace et al. |
| 6,075,844 | A | * | 6/2000 | Goldberg et al. ........ 379/88.17 |
| 6,282,269 | B1 | * | 8/2001 | Bowater et al. ......... 379/88.17 |
| 6,539,077 | B1 | * | 3/2003 | Ranalli et al. ............. 379/67.1 |
| 2002/0159569 | A1 | * | 10/2002 | Hasegawa ................... 379/67.1 |
| 2003/0063580 | A1 | * | 4/2003 | Pond ............................ 370/328 |

OTHER PUBLICATIONS

G. Vaudreuil et al., Voice Profile for Internet Mail, version 2, Network Working Group, Internet Engineering Task Force, Request for Comments No. 2421 (Sep. 1998).

* cited by examiner

*Primary Examiner*—Fan Tsang
*Assistant Examiner*—Olisa Anwah
(74) *Attorney, Agent, or Firm*—Leon R. Turkevich

(57) ABSTRACT

A recording device at a calling party premises is configured for recording a message for a messaging subscriber by the calling party, and sending the recorded message, via a data network, to a destination message store serving the messaging subscriber. The recording device sends the recorded message based on messaging subscriber attributes retrieved via the data network. Hence, a calling party can utilize a recording device at the calling party premises for recording a message for a messaging subscriber, and sending the message via the data network to a destination message store, eliminating the necessity of establishing any voice-grade connection or a media connection between the calling party and any server (e.g., messaging server, media gateway server, etc.).

54 Claims, 4 Drawing Sheets

ARRANGEMENT FOR LOCAL RECORDING OF A VOICE MESSAGE FOR DELIVERY TO DESTINATION MESSAGING SYSTEM VIA AN IP NETWORK

BACKGROUND OF THE INVENTION

1. Field of the Invention

The present invention relates to local messaging devices enabling recorded messages by calling parties to be sent to a destination messaging system via a data network.

2. Description of the Related Art

The evolution of the public switched telephone network has resulted in a variety of voice applications and services that can be provided to individual subscribers and business subscribers. Such services include voice messaging systems that enable landline or telephony subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

One particular problem related to voice messaging systems is the cost associated with a calling party leaving a voice message for a called party based on a no answer/busy condition at the called party premises. In particular, a calling party attempting to reach a called party will be connected to the called party's voice messaging system if the called party is not available, and begin a voice messaging session with the called party's voice messaging system which includes listening to a messaging prompt menu, recording a message, possibly reviewing/editing the message, and submitting the message for storage by the called party's voice messaging system. Such an arrangement uses a costly trunk line connection between the calling party and the called party's voice messaging system, resulting in increased costs for the messaging session, especially for use of long distance trunk line connections between interexchange carriers.

U.S. Pat. No. 6,061,432, to Wallace et al. discloses a voice mail system having SS7 signaling capabilities to obtain routing information, for sending a recorded message to a destination mail system, via the SS7 network. The disclosed voice mail system includes an SS7 signaling interface for sending Transactions Capabilities Applications Part (TCAP) query messages and receiving TCAP response messages via the SS7 signaling network in order to obtain voice mail capabilities information and routing information accessed from a subscriber profile record corresponding to a called party, bypassing existing Advanced Intelligent Network components, such as a standalone service control point.

However, transfer of messages via the SS7 network imposes a burden on the SS7 signaling network, and may create congestion conditions for SS7 signaling nodes and SS7 links configured for transferring SS7 call setup messages (e.g., ISDN User Part (ISUP) messages).

Voice over IP technology has been deployed as an alternative to conventional PSTN-based telephony systems relying on frame relay. Use of the open standards-based Internet Protocol (IP) network eliminates the reliance on existing PSTN-based telephony systems for telephony services or voice messaging services. An example of an IP-based messaging service is disclosed in commonly-assigned, copending application Ser. No. 09/608,187, filed Jun. 30, 2000, entitled IP Web Based Messaging System for Localized Management of Wireless Messaging, the disclosure of which is incorporated in its entirety herein by reference. The copending application Ser. No. 09/608,187 discloses an application server configured for providing messaging services to a calling party for a remote subscriber based on retrieval of subscriber attribute information obtained from a remote information database server (such as LDAP) via an Internet Protocol (IP) network. The application server also is configured for sending and retrieving messages from a standardized remote messaging server (such as IMAP) via the IP network based on a destination address specified in the subscriber attribute information. The access of the remote information database server and the standardized remote messaging server via the IP network enables the application server to provide portable application services for roaming subscribers or calling parties. Hence, application infrastructure can be shared among multiple servers to provide portable application servers, eliminating the necessity of routing telephone calls across interexchange carrier facilities or international facilities.

SUMMARY OF THE INVENTION

There is a need for an arrangement that enables a calling party to leave a message for a messaging subscriber, without the need for any bandwidth utilization in a network of a voice-grade connection for the calling party to record the message.

There is also a need for an arrangement that enables a calling party to utilize localized recording of messages, without the necessity of a media connection between the calling party device and a local server for recording of the message.

These and other needs are attained by the present invention, where a recording device at the calling party premises is configured for recording a message for a messaging subscriber by the calling party, and sending the recorded message, via a data network, to a destination message store serving the messaging subscriber. The recording device sends the recorded message based on messaging subscriber attributes retrieved via the data network.

Hence, a calling party can utilize a recording device at the calling party premises for recording a message for a messaging subscriber, and sending the message via the data network to a destination message store, eliminating the necessity of establishing any voice-grade connection or a media connection between the calling party and any server (e.g., messaging server, media gateway server, etc.). Hence, messages can be recorded and sent without utilizing server resources, improving the scalability of telephony and data networks by reducing server resource requirements normally reserved for messaging sessions.

One aspect of the present invention provides a method in a recording device at a calling party premises. The method includes recording a message by a calling party based on speech signals supplied by a telephony device configured for initiating a voice-grade media connection to a messaging subscriber. The method also includes retrieving messaging subscriber attributes specifying a destination message store for the messaging subscriber, and sending the recorded message, via the data network, to the destination message store based on the messaging subscriber attributes. Recording the message within the recording device at a calling party premises enables messages to be recorded without the necessity of using a voice-grade media connection. More-over, the retrieval of messaging subscriber attributes and sending the recorded message based on the messaging subscriber attributes enables the device to send the recorded message to the destination message store, without the consumption of any resources by a local or remote interactive messaging server, such as a voice mail service offering interactive voice mail operations.

Another aspect of the present invention provides a device coupled to a telephony device at a calling party premises. The device includes a media circuit, a messaging subscriber resource, and a network interface. The media circuit is configured for storing speech signals supplied by the telephony device as a recorded message configured for storage on a tangible medium. The messaging subscriber resource is configured for identifying a destination message store, for delivery of the recorded message to a messaging subscriber, based on inputs to the telephony device supplied by a calling party and retrieval of messaging subscriber attributes specifying the destination message store. The network interface is configured for sending the recorded message, via a data network, to the destination message store based on the messaging subscriber attributes.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
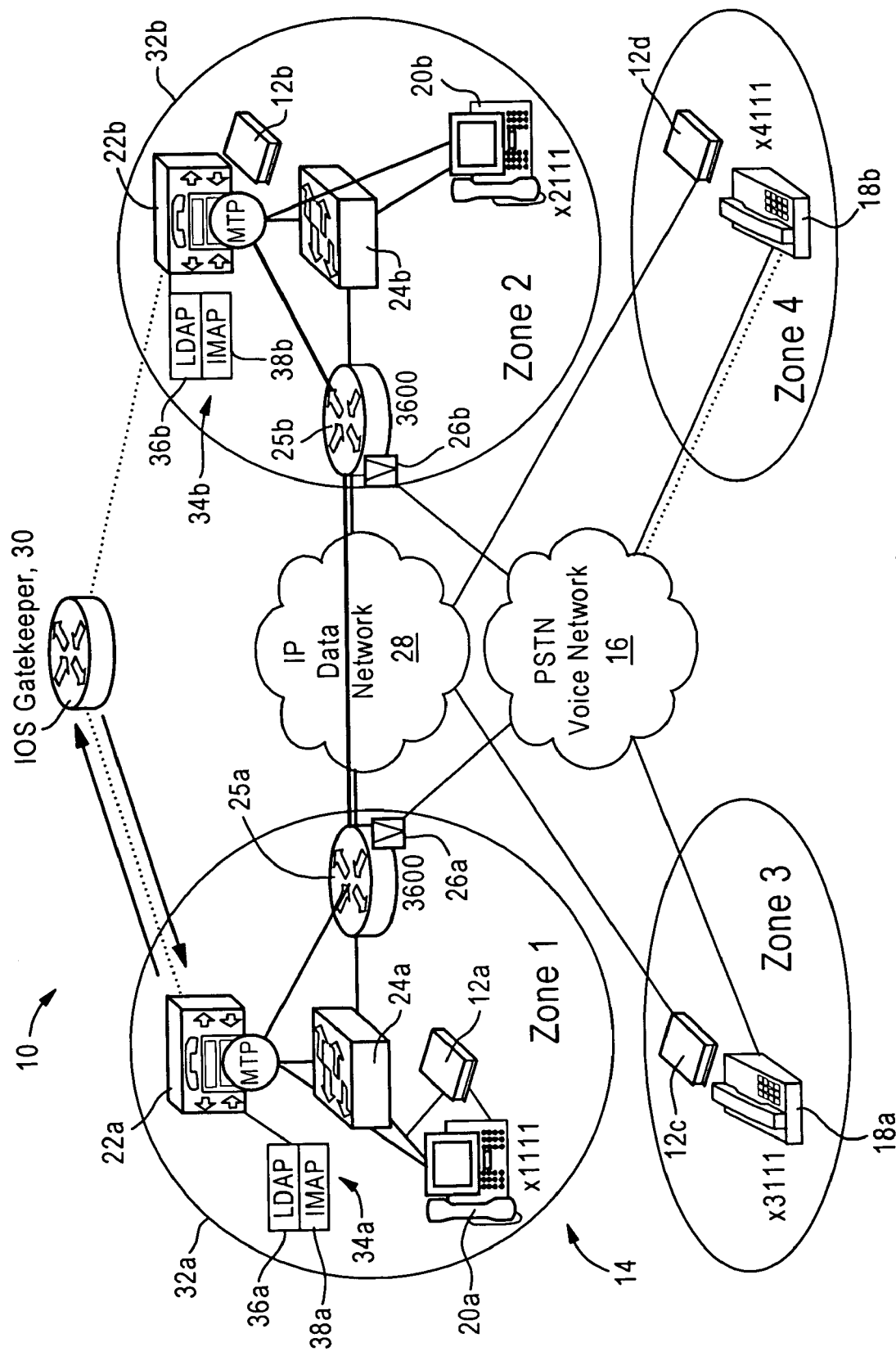
FIG. 1 is a block diagram illustrating an system enabling localized recording of a message by a calling party for a destination messaging subscriber, according to an embodiment of the present invention.

FIG. 1 is a block diagram illustrating a telephony system 10 utilizing recording devices 12 configured for recording messages by a calling party, and sending the recorded message to a destination message store, according to an embodiment of the present invention. The recording device 12 may be utilized in voice over IP based telephony networks 14 utilizing established voice over IP protocols (e.g., H.323), as well as conventional frame relay based public switched telephone networks 16 configured for providing telephony services to analog telephony devices 18.

For example, the voice over IP based telephony network 14, implemented for example according to H.323 protocol, includes a voice over IP telephony device 20, a call manager 22, a multipoint control unit (MCU) 24, and an IP router 24 having a voice over IP gateway 26. Calls passed between the IP routers 24 via an Internet protocol (IP) data network 28, for example the Internet, are managed by a gatekeeper 30. Each of these Voice over IP telephony components 20, 22, 24, 25, 26, and 30, are commercially available from Cisco Systems, Inc., San Jose, Calif.

As illustrated in FIG. 1, the voice over IP based telephony network 14 is subdivided into subnetworks 32, or "zones", typically corresponding to geographic zones. The call manager 22 is configured for setup and tear down of voice over IP telephone calls, according to H.323 Registration, Admission, and Status (RAS) Protocol. For example, in response to detecting that a calling party using the voice over IP telephony device 20a is attempting to make a call, the call manager 22a will send an Admission Request (ARQ) to the gatekeeper 30 specifying an amount of bandwidth based on the codec utilized (e.g., 128 kbps for a G.711 codec or 20 kbps for a G.729 codec). If the gatekeeper 30 determines that bandwidth is available, the gatekeeper 30 returns an Admission Confirm (ACF) message permitting the call manager 22a to complete the call; if bandwidth is not available, the gatekeeper 30 outputs an Admission Reject (ARJ), preventing call completion calling the caller to receive a busy tone. The MCU 24 is utilized for any multipoint conferencing between H.323 terminals (e.g., telephony devices 20).

The call manager 22a completes the call via the IP router 25. For example, the call manager 22a is configured for establishing a call via the data network 28 according to H.323 protocol. If the destination party is served by the public switched telephone network 16 (e.g., the analog telephone 18a or 18b), the router 25a utilizes the voice over IP gateway 26a to convert between packet switched communications and circuit-switched TI PRI ISDN connections in the public switched telephone networks 16.

The voice over IP based telephony network 14 also includes messaging systems 34, for example unified messaging systems, including IP based subscriber directories 36, and IP based message stores 38. Each subscriber directory 36 is configured for storing subscriber profile information including user name, telephone number, voice messaging preferences, etc. according to LDAP protocol. Each subscriber message store 38 is configured for storing subscriber messages, and personalized prompts, for example according to IMAP protocol. Although not shown, the voice over IP based telephony network 14 also may include a messaging server configured for storage and retrieval of the messages for a messaging subscriber.

Figure 2A:
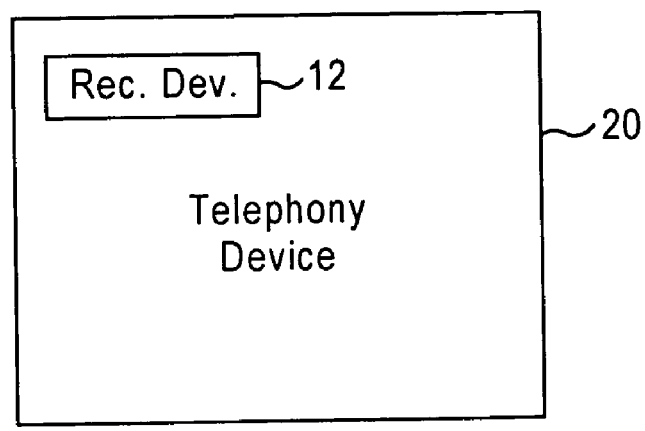
FIGS. 2A and 2B are diagrams illustrating alternative implementations of the recording device of FIG. 1 at the calling party premises.
Figure 2B:
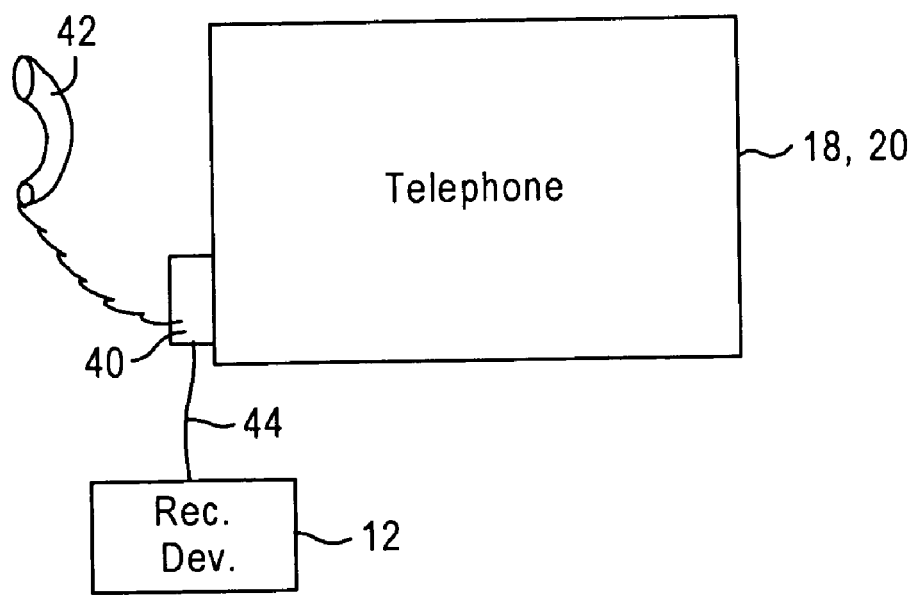

According to the disclosed embodiment, a calling party is able to record and send a message, via the data network 28, using a recording device 12. In particular, the recording device 12 is configured for recording the message, retrieving messaging subscriber attributes from the subscriber directory 36, and sending the recorded message via the data network 28 to the destination message store 38. As illustrated in FIG. 2A, the recording device 12 may be implemented within the telephony device 20; alternately, as illustrated in FIG. 2B, the recording device 12 may be coupled to the telephony device 18 or 20 using a coupler 40 configured for splitting analog signals sent to and from the handset 42 (e.g., speech signals, DTMF digits, etc.) to the recording device 12, and a connecting cable 44.

As described below, the recording device 12 includes an Internet protocol network interface, enabling the recording device 12 to access the subscriber profile information from the LDAP directory 36 for a destination messaging subscriber, in order to enable a recorded message to be sent via the data network 28 to the destination message store 38 based on the messaging subscriber attributes.

Hence, messaging operations can be performed by a calling party without the necessity of utilizing a media connection to a messaging server. Hence, a calling party can perform messaging operations for one or multiple messaging subscribers using his own recording device, without relying on remote voice mail resources, with greater control and convenience for the calling party.

Figure 3:
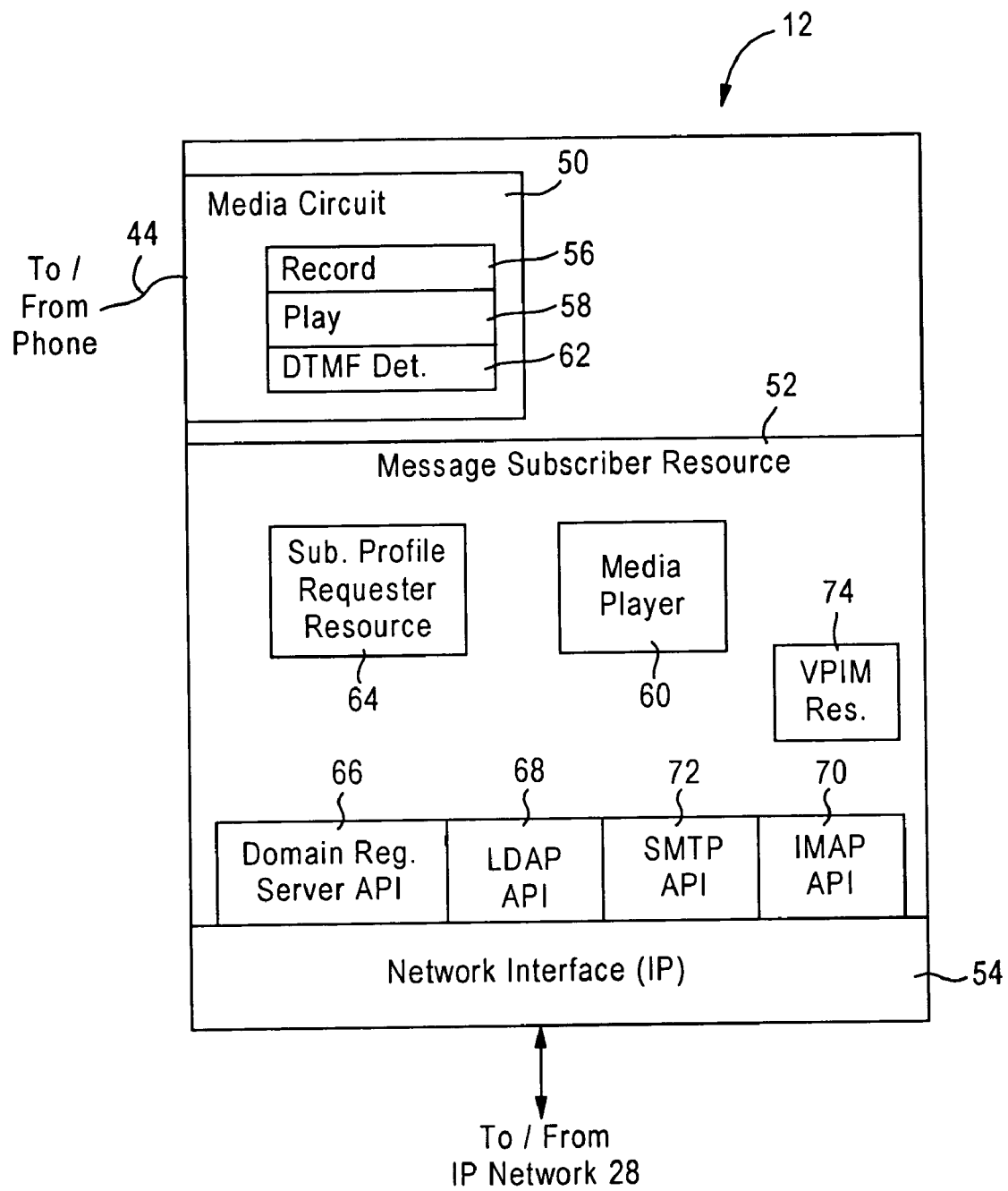
FIG. 3 is a diagram illustrating in detail the recording device of FIGS. 1 and 2 according to an embodiment of the present invention.

FIG. 3 is a block diagram illustrating in further detail the recording device 12 according to an embodiment of the present invention. The recording device 12 includes a media circuit 50, a messaging subscriber resource 52, and a network interface 54.

The media circuit 50 is configured for storing speech signals supplied by the telephony device 18 or 20; in particular, the media circuit 50 includes a recording resource 56 configured for generating, from received speech signals, a media file (e.g., a .wav file) that can be stored on a tangible medium, for example a hard disk or flash memory. The media circuit 50 also includes a playback resource 58 configured for generating analog audio signals in response to audio data from a media player 60 (e.g., playback of a received announcement, or review of a recorded message prior to submission). The media circuit 50 also includes a DTMF detection circuit 62 configured for detecting and converting DTMF digits into ASCII based text for retrieval of messaging subscriber attributes based on the DTMF digits, described below.

The network interface 54 is configured for sending a recorded message via the data network 28 according to Internet protocol. As described below, the network interface 54 also is configured for sending queries for the messaging subscriber attributes, and receiving the messaging subscriber attributes via the data network 28.

The messaging subscriber resource 52 is configured for generating a query, based on the DTMF digits input by the calling party and detected by the DTMF detection circuit 62, for retrieval of the messaging subscriber attributes. In particular, the messaging subscriber resource 52 includes a subscriber profile requester resource 64, configured for generating a query based on the network topology; for example, the subscriber profile requester resource 64 accesses a selected application programming interface (API) based on the manner in which the recording device 12 is connected to the IP network 28. For example, the messaging subscriber resource 52 includes a domain registry server API 66 and an LDAP API 68. The domain registry server API 66 is configured for sending an open protocol query for the messaging subscriber attributes to a centralized server, configured for storing messaging subscriber attributes, or identifiers for their respective directories 36, based on a dialed number input by the calling party. Use of the domain registry server API 66 may be particularly effective in a recording device 12c lacking a locally accessible LDAP directory 36; in this case, the centralized server may send domain registry information to the recording device 12. Once the recording device 12 has received domain registry information for the destination party, the subscriber profile requester resource 64 can access the LDAP API 68 by sending an LDAP query to the subscriber directory 36 serving the destination messaging subscriber.

In response to receiving the messaging subscriber attributes specifying a subscriber message store for the messaging subscriber from the LDAP directory 36, the messaging subscriber resource 52 can send the recorded message via the data network 28 as a media attachment to an e-mail message. Depending on the implementation protocol of the subscriber message store 38, the messaging subscriber resource 52 may access an IMAP API 72 store the e-mail message in the subscriber message store 38 according to IMAP protocol; alternately the messaging subscriber resource 52 may access an SMTP API 72 to send the recorded message has a media attachment according to SMTP protocol.

An alternative arrangement for retrieving messaging subscriber attributes, and sending the recorded message to the subscriber message store 38, involves the use of a Voice Profile for Internet Mail (VPIM) resource 74, configured for transporting recorded messages according to VPIM protocol, ver. 2, as specified by RFC 2421 published by the Internet Engineering Task Force (IETF), available on the World Wide Web at www.ietf.org, the text of which is incorporated in its entirety herein by reference. In particular, VPIM specifies a packaging format for Multipurpose Internet Mail Extensions (MIME) encoded data using SMTP for transport of voice mail messages. The VPIM protocol utilizes vCard features (described in the above-incorporated RFC 2421) for passing contact information about a sender to the recipient. VPIM is intended for intentional creation on the sender's side, and addressing is blind such that there is no address book query protocol. Rather, two-way service agreements typically are implemented between the administrators of the voicemail systems 34a and 34b to enable VPIM based message transfer.

Hence, a recording device 12 is able to send a recorded message to a destination message store based on retrieval of messaging subscriber attributes for the destination party (i.e., the called party), based on the dialed digits input by the calling party.

Figure 4:
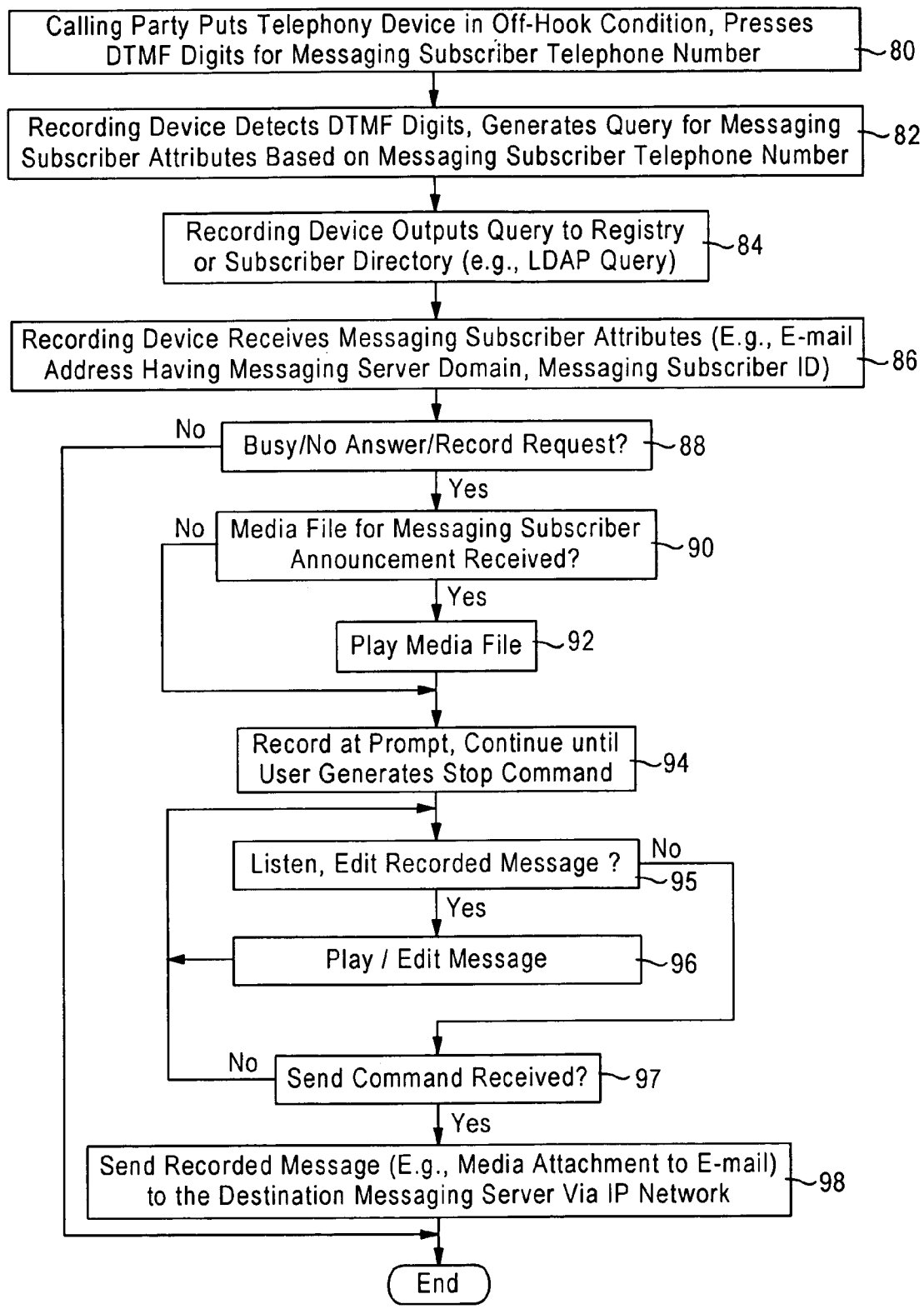
FIG. 4 is a diagram illustrating the method of recording at a calling party premises a message for destination messaging subscriber, according to an embodiment of the present invention.

FIG. 4 is a diagram illustrating the method of recording and sending a message at a calling party premises to a destination message store, according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

The method begins in step 80, where the telephony device is placed in an off-hook condition by the calling party, for example by removing the handset 42, or pressing a speaker phone button on the telephony device. The DTMF detector 62 of the recording device 12 detects in step 82 the DTMF digits input by the calling party, and the subscriber profile requester resource 64 generates a query for messaging subscriber attributes based on the messaging subscriber telephone number input by the calling party in step 80.

The messaging subscriber resource 52 outputs in step 84 the query to a registry using the domain registry server API 66, or a subscriber directory 36 using the LDAP API 68. As described above, the domain registry server API 66 may be used if no local subscriber directory 36 is available; however, the recording device 12a within the subnetwork 32a typically will utilize the LDAP API 68 to send the query to the local subscriber registry 36a; if the destination subscriber belongs to a remote subnetwork 32b, the LDAP 36a may issue its own query to the LDAP directory 36b on behalf of the calling party at the premises of the IP telephony device 20a.

In the case of VPIM based message transfer, the administrators of the messaging systems 34 enter addresses for the respective destination systems, and create DTMF identifiers to enable users to address the destination system by telephone. For example, the administrator for the messaging system 34*a* configures the domain name "@vpim.companyb.com" with "123" as the corresponding DTMF identifier for the messaging system 34*b*. In this case, the VPIM resource 74 retrieves the DTMF identifier from the local messaging system 34*a*, for example from a VPIM registry within the LDAP directory 36*a*, based on supplying the dialed number, which is used by the local messaging system 34*a* to identify the appropriate VPIM destination address (e.g., the domain name "@vpim.companyb.com") in combination with rules applied by the messaging system 34*a* for specific addressing on the remote messaging system 34*b* (e.g., identifying a subscriber mailbox and confirming the VPIM destination address for the subscriber). Hence, the local messaging system 34*a* can utilize the dialed number to send a query to the remote messaging system 34*b* via the IP network 28, to identify the subscriber mailbox and confirm the VPIM destination address.

The recording device 12 receives in step 86 the messaging subscriber attributes for the remote messaging subscriber via the data network 28, including for example the e-mail address for the messaging subscriber including the messaging server domain for the message store 38, and the messaging subscriber identifier. In the case of VPIM messaging, the VPIM resource 74 receives the VPIM destination address from the local messaging system (e.g., 34*a*) via the corresponding local data network 32*a* after the local messaging system 34*a* has received the confirmed VPIM destination address, and/or the subscriber mailbox, from the remote system 34*b* via the IP network 28.

If in step 88 the messaging subscriber resource 52 detects a condition requiring recording a message, for example a busy or no answer condition, or a record request by the calling party (e.g., by pressing a record button on the device 12), the messaging subscriber resource 52 determines if a media file for the messaging subscriber announcement is received in step 90. For example, the messaging subscriber attributes retrieved in step 86 may identify a personalized prompt stored in the message store 38 for the messaging subscriber. The media player 60 and the player resource 58 of the recording device 12 play in step 92 the media file, if available, and the recording resource 56 records in step 94 the message by the calling party until the user generates a stop command, for example by pressing a key on the telephony device 18 or 20. The calling party may then review the message prior to submission in steps 95 and 96. In particular, if in step 95 the calling party issues a command to listen or edit the recorded message, the media player 60 plays the recorded message in step 96.

Upon detecting a send command in step 97, the messaging subscriber resource 52 sends in step 98 the recorded message to the destination messaging server (i.e., message store) 38*b* via the IP network 28. As described above, the recorded message may be sent as a media attachment to an e-mail message. In the case of VPIM messaging, the VPIM resource 74 appends the mailbox identifier of the messaging subscriber (e.g., the messaging subscriber's mailbox extension "68100") to the VPIM destination address ("123" mapped to @(vpim.companyb.com), and sends the recorded message to the destination messaging server 38*b* at the address "68100@vpim.companyb.com".

As apparent from the foregoing, the particular sequence of steps in FIG. 4 may be modified, where the query output in step 84 may be performed in response to the detection of a condition requiring a message in step 90.

According to the disclosed embodiment, messaging operations may be performed exclusively by the recording device at a calling party premises, eliminating the necessity of any messaging session between the calling party and a messaging server that may otherwise consume voice grade resources. Hence, messaging operations can be more scalable throughout unified messaging systems, providing calling party greater flexibility in generating and sending voice messages, at a lower cost.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a recording device at a calling party premises, the method comprising:
   recording a message by a calling party based on speech signals supplied by a telephony device configured for initiating a voice-grade media connection to a messaging subscriber, wherein the recording device is integrated within the telephony device;
   retrieving, via an Internet Protocol (IP) data network, messaging subscriber attributes specifying a destination message store for the messaging subscriber, the retrieving step including sending onto the IP network an open-protocol query according to Lightweight Directory Access Protocol (LDAP) for the messaging subscriber attributes to a server configured for storing messaging subscriber attributes, based on a dialed number input by the calling party; and
   sending the recorded message, via the IP data network, to the destination message store based on the messaging subscriber attributes.

2. The method of claim 1, the method further comprising selectively playing the recorded message based on calling party commands, for review by the calling party prior to the sending step.

3. The method of claim 1, wherein the retrieving step includes obtaining, as part of the messaging subscriber attributes, address information for the destination message store and the messaging subscriber, the sending step including sending the recorded message as a media attachment to an e-mail message based on the address information.

4. The method of claim 3, wherein the sending step includes sending the recorded message according to one of SMTP protocol, IMAP protocol, and VPIM protocol.

5. The method of claim 1, wherein the retrieving step further includes retrieving the messaging subscriber attributes from a gateway server configured for controlling the establishment of the voice grade media connection between the telephony device and a destination device identified based on a dialed number input by the calling party.

6. The method of claim 5, further comprising selectively playing the recorded message based on calling party commands, for review by the calling party prior to the sending step.

7. The method of claim 1, further comprising:
   receiving a media file via the data network for the messaging subscriber; and
   playing the media file as an announcement to the calling party on behalf of the messaging subscriber.

8. A recording device at a calling party premises, the recording device comprising:
   a media circuit configured for storing speech signals supplied by a telephony device as a recorded message configured for storage on a tangible medium;

a messaging subscriber resource configured for identifying a destination message store, for delivery of the recorded message to a messaging subscriber, based on inputs to the telephony device supplied by a calling party and retrieval, via an Internet Protocol (IP) data network, of messaging subscriber attributes specifying the destination message store, the messaging subscriber resource configured for sending onto the data network an open-protocol query according to Lightweight Directory Access Protocol (LDAP) for the messaging subscriber attributes to a server configured for storing messaging subscriber attributes, based on a dialed number input by the calling party; and an IP network interface configured for sending the recorded message, via the IP data network, to the destination message store based on the messaging subscriber attributes;

wherein the recording device is integrated within the telephony device.

9. The recording device of claim 8, further comprising a media player configured for selectively playing the recorded message based on calling party commands, for review by the calling party prior to sending the recorded message.

10. The recording device of claim 8, wherein the messaging subscriber resource is configured for obtaining, as part of the messaging subscriber attributes, address information for the destination message store and the messaging subscriber, the messaging subscriber resource configured for sending the recorded message as a media attachment to an e-mail message based on the address information.

11. The recording device of claim 10, wherein the messaging subscriber resource is configured for sending the recorded message according to one of SMTP protocol, IMAP protocol, and VPIM protocol.

12. The recording device of claim 8, wherein the messaging subscriber resource is configured for retrieving the messaging subscriber attributes from a gateway server configured for controlling the establishment of voice grade media connections between the telephony device and a destination device identified based on a dialed number input by the calling party.

13. The recording device of claim 12, further comprising a media player configured for selectively playing the recorded message based on calling party commands, for review by the calling party prior to sending the recorded message.

14. A computer readable medium having stored thereon sequences of instructions for executing a messaging application in a recording device at a calling party premises, the sequences of instructions including instructions for performing the steps of:

recording a message by a calling party based on speech signals supplied by a telephony device configured for initiating a voice-grade media connection to a messaging subscriber, wherein the recording device is integrated within the telephony device;

retrieving, via an Internet Protocol (IP) data network, messaging subscriber attributes specifying a destination message store for the messaging subscriber, the retrieving step including sending onto the IP network an open-protocol query according to Lightweight Directory Access Protocol (LDAP) for the messaging subscriber attributes to a server configured for storing messaging subscriber attributes, based on a dialed number input by the calling party; and sending the recorded message, via the IP data network, to the destination message store based on the messaging subscriber attributes.

15. The medium of claim 14, further including instructions for performing the step of selectively playing the recorded message based on calling party commands, for review by the calling party prior to the sending step.

16. The medium of claim 14, wherein the retrieving step includes obtaining, as part of the messaging subscriber attributes, address information for the destination message store and the messaging subscriber, the sending step including sending the recorded message as a media attachment to an e-mail message based on the address information.

17. The medium of claim 16, wherein the sending step includes sending the recorded message according to one of SMTP protocol, IMAP protocol, and VPIM protocol.

18. The medium of claim 14, wherein the retrieving step further includes retrieving the messaging subscriber attributes from a gateway server configured for controlling the establishment of the voice grade media connection between the telephony device and a destination device identified based on a dialed number input by the calling party.

19. The medium of claim 18, further including instructions for performing the step of selectively playing the recorded message based on calling party commands, for review by the calling party prior to the sending step.

20. The medium of claim 14, further comprising instructions for performing the steps of:

receiving a media file via the data network for the messaging subscriber; and playing the media file as an announcement to the calling party on behalf of the messaging subscriber.

21. A recording device at a calling party premises, the recording device comprising:

means for recording a message by a calling party based on speech signals supplied by a telephony device configured for initiating a voice-grade media connection to a messaging subscriber;

means for retrieving, via an Internet Protocol (IP) data network, messaging subscriber attributes specifying a destination message store for the messaging subscriber, the retrieving means configured for sending onto the IP network an open-protocol query according to Lightweight Directory Access Protocol (LDAP) for the messaging subscriber attributes to a server configured for storing messaging subscriber attributes, based on a dialed number input by the calling party; and means for sending the recorded message, via the IP data network, to the destination message store based on the messaging subscriber attributes;

wherein the recording device is integrated within the telephony device.

22. The recording device of claim 21, further comprising means for selectively playing the recorded message based on calling party commands, for review by the calling party prior to sending the recorded message.

23. The recording device of claim 21, wherein the retrieving means is configured for obtaining, as part of the messaging subscriber attributes, address information for the destination message store and the messaging subscriber, the retrieving means configured for sending the recorded message as a media attachment to an e-mail message based on the address information.

24. The recording device of claim 23, wherein the sending means is configured for sending the recorded message according to one of SMTP protocol, IMAP protocol, and VPIM protocol.

25. The recording device of claim 21, wherein the retrieving means is configured for retrieving the messaging subscriber attributes from a gateway server configured for controlling the establishment of the voice grade media connection between the telephony device and a destination device identified based on a dialed number input by the calling party.

26. The recording device of claim 25, further comprising means for selectively playing the recorded message based on calling party commands, for review by the calling party prior to sending the recorded message.

27. The recording device of claim 21, further comprising:
means for receiving a media file via the data network for the messaging subscriber; and
means for playing the media file as an announcement to the calling party on behalf of the messaging subscriber.

28. A method in a recording device at a calling party premises, the method comprising:
recording a message by a calling party based on speech signals supplied by a telephony device configured for initiating a voice-grade media connection to a messaging subscriber;
retrieving, via an Internet Protocol (IP) data network, messaging subscriber attributes specifying a destination message store for the messaging subscriber, the retrieving step including sending onto the IP network an open-protocol query according to Lightweight Directory Access Protocol (LDAP) for the messaging subscriber attributes to a server configured for storing messaging subscriber attributes, based on a dialed number input by the calling party; and
sending the recorded message, via the IP data network, to the destination message store based on the messaging subscriber attributes;
wherein the recording step includes receiving the speech signals via a connecting cable that is connected to a coupler of the telephony device, the connecting cable distinct from the voice-grade media connection.

29. A recording device coupled to a telephony device at a calling party premises, the recording device comprising:
a media circuit configured for storing speech signals supplied by the telephony device as a recorded message configured for storage on a tangible medium;
a messaging subscriber resource configured for identifying a destination message store, for delivery of the recorded message to a messaging subscriber, based on inputs to the telephony device supplied by a calling party and retrieval, via an Internet Protocol (IP) data network, of messaging subscriber attributes specifying the destination message store, the messaging subscriber resource configured for sending onto the data network an open-protocol query according to Lightweight Directory Access Protocol (LDAP) for the messaging subscriber attributes to a server configured for storing messaging subscriber attributes, based on a dialed number input by the calling party; and
an IP network interface configured for sending the recorded message, via the IP data network, to the destination message store based on the messaging subscriber attributes;
wherein the media circuit is configured for receiving the speech signals via a connecting cable coupled to the device, the connecting cable coupled to a coupler of the telephony device and distinct from any voice-grade media connection used by the telephony device for sending and receiving calls.

30. A computer readable medium having stored thereon sequences of instructions for executing a messaging application in a recording device at a calling party premises, the sequences of instructions including instructions for performing the steps of:
recording a message by a calling party based on speech signals supplied by a telephony device configured for initiating a voice-grade media connection to a messaging subscriber;
retrieving, via an Internet Protocol (IP) data network, messaging subscriber attributes specifying a destination message store for the messaging subscriber, the retrieving step including sending onto the IP network an open-protocol query according to Lightweight Directory Access Protocol (LDAP) for the messaging subscriber attributes to a server configured for storing messaging subscriber attributes, based on a dialed number input by the calling party; and
sending the recorded message, via the IP data network, to the destination message store based on the messaging subscriber attributes;
wherein the recording step includes receiving the speech signals via a connecting cable that is connected to a coupler of the telephony device, the connecting cable distinct from the voice-grade media connection.

31. A recording device coupled to a telephony device at a calling party premises, the recording device comprising:
means for recording a message by a calling party based on speech signals supplied by a telephony device configured for initiating a voice-grade media connection to a messaging subscriber;
means for retrieving, via an Internet Protocol (IP) data network, messaging subscriber attributes specifying a destination message store for the messaging subscriber, the retrieving means configured for sending onto the IP network an open-protocol query according to Lightweight Directory Access Protocol (LDAP) for the messaging subscriber attributes to a server configured for storing messaging subscriber attributes, based on a dialed number input by the calling party; and
means for sending the recorded message, via the IP data network, to the destination message store based on the messaging subscriber attributes;
wherein the recording means is configured for receiving the speech signals via a connecting cable that is connected to a coupler of the telephony device, the connecting cable distinct from the voice-grade media connection.

32. The method of claim 28, further comprising selectively playing the recorded message based on calling party commands, for review by the calling party prior to the sending step.

33. The method of claim 28, wherein the retrieving step includes obtaining, as part of the messaging subscriber attributes, address information for the destination message store and the messaging subscriber, the sending step including sending the recorded message as a media attachment to an e-mail message based on the address information.

34. The method of claim 33, wherein the sending step includes sending the recorded message according to one of SMTP protocol, IMAP protocol, and VPIM protocol.

35. The method of claim 28, wherein the retrieving step further includes retrieving the messaging subscriber attributes from a gateway server configured for controlling the establishment of the voice grade media connection between the telephony device and a destination device identified based on a dialed number input by the calling party.

36. The method of claim 35, further comprising selectively playing the recorded message based on calling party commands, for review by the calling party prior to the sending step.

37. The method of claim 28, further comprising:
receiving a media file via the data network for the messaging subscriber; and
playing the media file as an announcement to the calling party on behalf of the messaging subscriber.

38. The recording device of claim 29, further comprising a media player configured for selectively playing the recorded message based on calling party commands, for review by the calling party prior to sending the recorded message.

39. The recording device of claim 29, wherein the messaging subscriber resource is configured for obtaining, as part of the messaging subscriber attributes, address information for the destination message store and the messaging subscriber, the messaging subscriber resource configured for sending the recorded message as a media attachment to an e-mail message based on the address information.

40. The recording device of claim 39, wherein the messaging subscriber resource is configured for sending the recorded message according to one of SMTP protocol, IMAP protocol, and VPIM protocol.

41. The recording device of claim 29, wherein the messaging subscriber resource is configured for retrieving the messaging subscriber attributes from a gateway server configured for controlling the establishment of voice grade media connections between the telephony device and a destination device identified based on a dialed number input by the calling party.

42. The recording device of claim 41, further comprising a media player configured for selectively playing the recorded message based on calling party commands, for review by the calling party prior to sending the recorded message.

43. The medium of claim 30, further including instructions for performing the step of selectively playing the recorded message based on calling party commands, for review by the calling party prior to the sending step.

44. The medium of claim 30, wherein the retrieving step includes obtaining, as part of the messaging subscriber attributes, address information for the destination message store and the messaging subscriber, the sending step including sending the recorded message as a media attachment to an e-mail message based on the address information.

45. The medium of claim 44, wherein the sending step includes sending the recorded message according to one of SMTP protocol, IMAP protocol, and VPIM protocol.

46. The medium of claim 30, wherein the retrieving step further includes retrieving the messaging subscriber attributes from a gateway server configured for controlling the establishment of the voice grade media connection between the telephony device and a destination device identified based on a dialed number input by the calling party.

47. The medium of claim 46, further including instructions for performing the step of selectively playing the recorded message based on calling party commands, for review by the calling party prior to the sending step.

48. The medium of claim 30, further comprising instructions for performing the steps of:
receiving a media file via the data network for the messaging subscriber; and
playing the media file as an announcement to the calling party on behalf of the messaging subscriber.

49. The recording device of claim 31, further comprising means for selectively playing the recorded message based on calling party commands, for review by the calling party prior to sending the recorded message.

50. The recording device of claim 31, wherein the retrieving means is configured for obtaining, as part of the messaging subscriber attributes, address information for the destination message store and the messaging subscriber, the retrieving means configured for sending the recorded message as a media attachment to an e-mail message based on the address information.

51. The recording device of claim 50, wherein the sending means is configured for sending the recorded message according to one of SMTP protocol, IMAP protocol, and VPIM protocol.

52. The recording device of claim 31, wherein the retrieving means is configured for retrieving the messaging subscriber attributes from a gateway server configured for controlling the establishment of the voice grade media connection between the telephony device and a destination device identified based on a dialed number input by the calling party.

53. The recording device of claim 52, further comprising means for selectively playing the recorded message based on calling party commands, for review by the calling party prior to sending the recorded message.

54. The recording device of claim 31, further comprising:
means for receiving a media file via the data network for the messaging subscriber; and
means for playing the media file as an announcement to the calling party on behalf of the messaging subscriber.

* * * * *